(12) United States Patent
Lee (10) Patent No.: US 12,252,186 B2
(45) Date of Patent: Mar. 18, 2025

(54) STEER BY WIRE TYPE STEERING APPARATUS

(71) Applicant: HL Mando Corporation, Pyeongtaek-si (KR)

(72) Inventor: Jun Gyu Lee, Seoul (KR)

(73) Assignee: HL Mando Corporation, Gyeonggi-do (KR)

( * ) Notice: Subject to any disclaimer, the term of this patent is extended or adjusted under 35 U.S.C. 154(b) by 457 days.

(21) Appl. No.: 17/875,338

(22) Filed: Jul. 27, 2022

(65) Prior Publication Data

US 2023/0039424 A1 Feb. 9, 2023

(30) Foreign Application Priority Data

Aug. 2, 2021 (KR) .................... 10-2021-0101139

(51) Int. Cl.
*B62D 5/00* (2006.01)
(52) U.S. Cl.
CPC .................... *B62D 5/001* (2013.01)

(58) Field of Classification Search
CPC ...................................................... B62D 5/001
See application file for complete search history.

(56) References Cited

U.S. PATENT DOCUMENTS

| | | | |
|---|---|---|---|
| 6,688,645 B2* | 2/2004 | Andonian | B62D 5/001 180/6.26 |
| 11,027,770 B2* | 6/2021 | Cimatti | B62D 5/001 |
| 11,840,289 B2* | 12/2023 | Heo | B62D 1/16 |
| 2020/0070871 A1* | 3/2020 | Du | B62D 15/0215 |
| 2024/0391516 A1* | 11/2024 | Woellner | B62D 5/0442 |

* cited by examiner

*Primary Examiner* — Kevin Hurley
(74) *Attorney, Agent, or Firm* — WOMBLE BOND DICKINSON (US) LLP

(57) ABSTRACT

A steer by wire type steering apparatus according to the embodiments of the present disclosure may comprise a rotating member having a spiral guide hole penetrating through one side and the other side in the axial direction and rotating in conjunction with a steering shaft, a housing in which the rotating member is built, a housing cover coupled to one end of the housing, and a guide pin inserted in the axial direction into the guide hole, one end supported by the housing and the other end supported by the housing cover.

17 Claims, 10 Drawing Sheets

STEER BY WIRE TYPE STEERING APPARATUS

CROSS REFERENCE TO RELATED APPLICATION

This application claims the benefit and priority from Korean Patent Application No. 10-2021-0101139, filed in the Republic of Korea on Aug. 2, 2021, the entire contents of which are hereby incorporated by reference for all purposes as if fully set forth into the present application.

BACKGROUND

Technical Field

Embodiments of the present disclosure relate to a steer by wire type steering apparatus, and more particularly, to a steer by wire type steering apparatus capable of mechanically stopping the steering wheel from rotating further when the rotation of the vehicle wheel reaches its maximum point.

Description of the Related Art

In general, power steering has been developed and applied to a vehicle steering apparatus to provide convenience in driving operation by assisting a driver's operating force of a steering wheel. Power steering was developed and applied in hydraulic type using hydraulic pressure, electro-hydraulic type using hydraulic pressure and electric power of the motor at the same time, and electric type using only electric power of the motor.

Recently, instead of removing a mechanical connection device such as a steering column or a universal joint or a pinion shaft between the steering wheel and the vehicle wheel, the Steer By Wire (SBW) type steering apparatus for steering a vehicle using an electric motor has been developed and applied.

However, in the case of such a steer by wire type steering system, since there is no mechanical connection between the steering shaft and the vehicle wheels, the driver's steering wheel rotation can rotate indefinitely, thereby reducing the driver's steering feeling and steering stability.

Therefore, when the rotation of the vehicle wheel reaches its maximum point (when the steering wheel or the vehicle wheel is in a full-turn state in a general steering system), there is a need for research to prevent the steering wheel from rotating any more.

SUMMARY

Embodiments of the present disclosure provide a steer by wire type steering apparatus capable of increasing a driver's steering feel and steering stability by preventing the steering wheel from mechanically rotating anymore when the rotation of the vehicle wheel reaches the maximum point.

In addition, the purpose of the embodiments of the present disclosure are not limited thereto, and other objects not mentioned will be clearly understood by those skilled in the art from the following description.

A steer by wire type steering apparatus according to the embodiments of the present disclosure may comprise a rotating member having a spiral guide hole penetrating through one side and the other side in the axial direction and rotating in conjunction with a steering shaft, a housing in which the rotating member is built in, a housing cover coupled to one end of the housing, and a guide pin inserted in the axial direction into the guide hole, one end supported by the housing and the other end supported by the housing cover.

According to the embodiments of the present disclosure, there is provided a steer by wire type steering apparatus that increases a driver's steering feel and steering safety by preventing the steering wheel from mechanically rotating any more when the rotation of the vehicle wheel reaches the maximum point.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
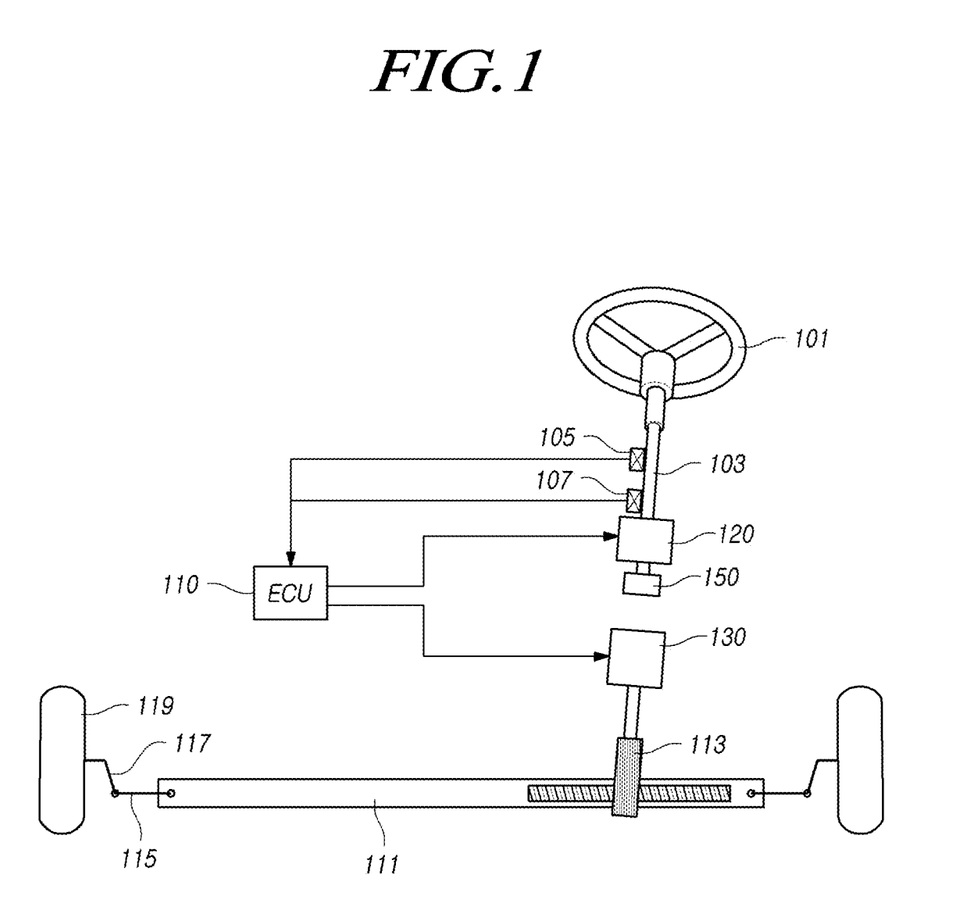
FIG. 1 is a schematic view illustrating a steer by wire type steering apparatus according to the embodiments of the present disclosure.
Figure 2:
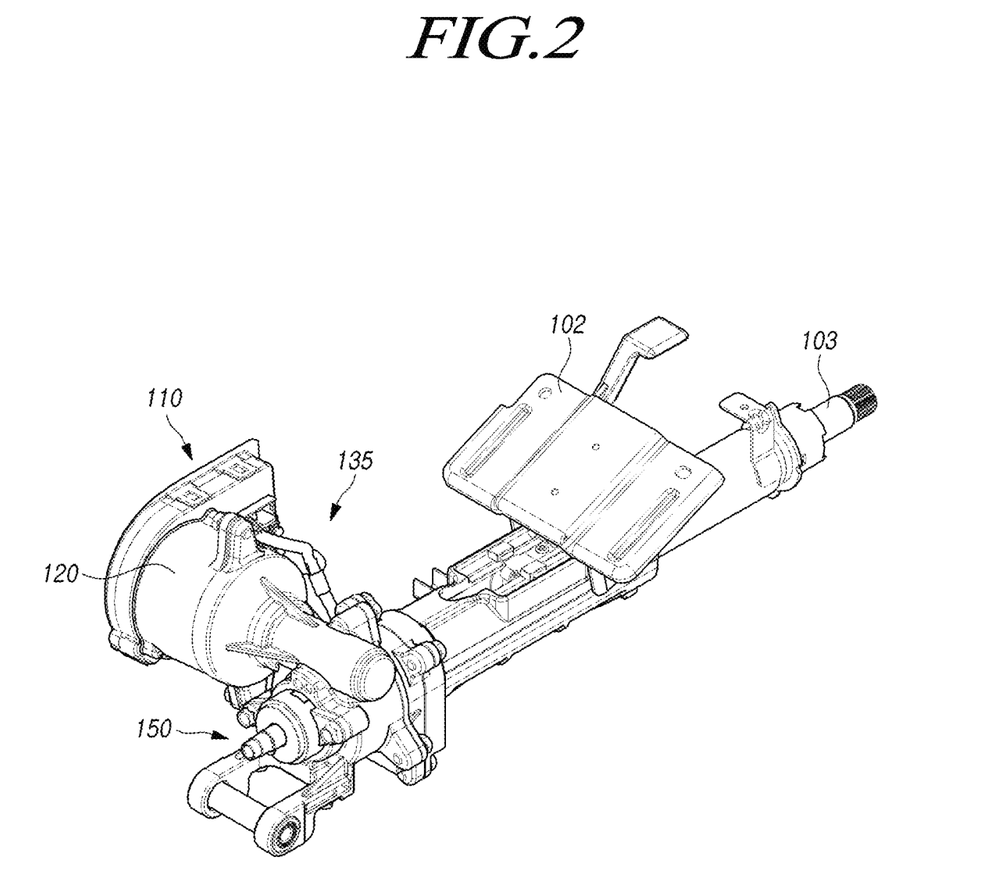
FIG. 2 is a perspective view illustrating a steer by wire type steering apparatus according to the embodiments of the present disclosure.
Figure 3:
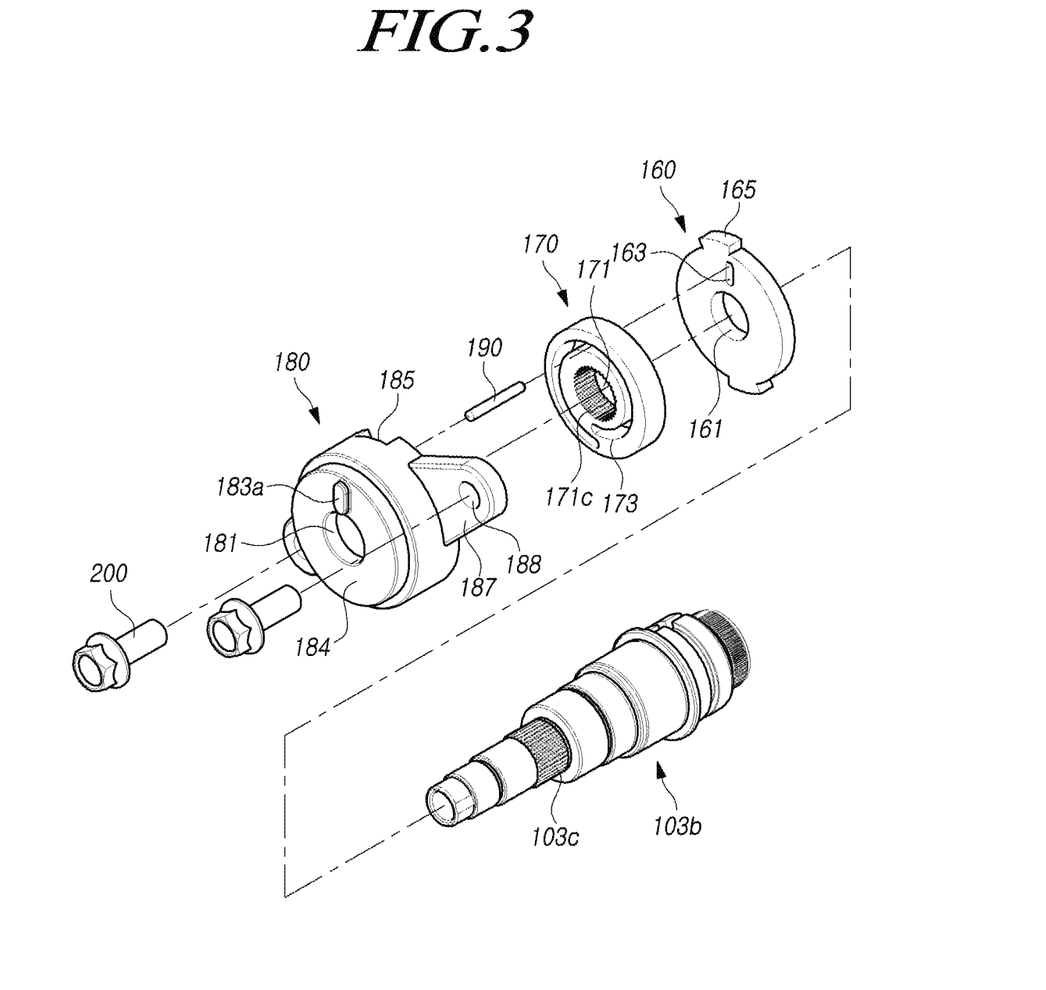
FIGS. 3 and 4 are exploded perspective views illustrating a steer by wire type steering apparatus according to the embodiments of the present disclosure.
Figure 4:
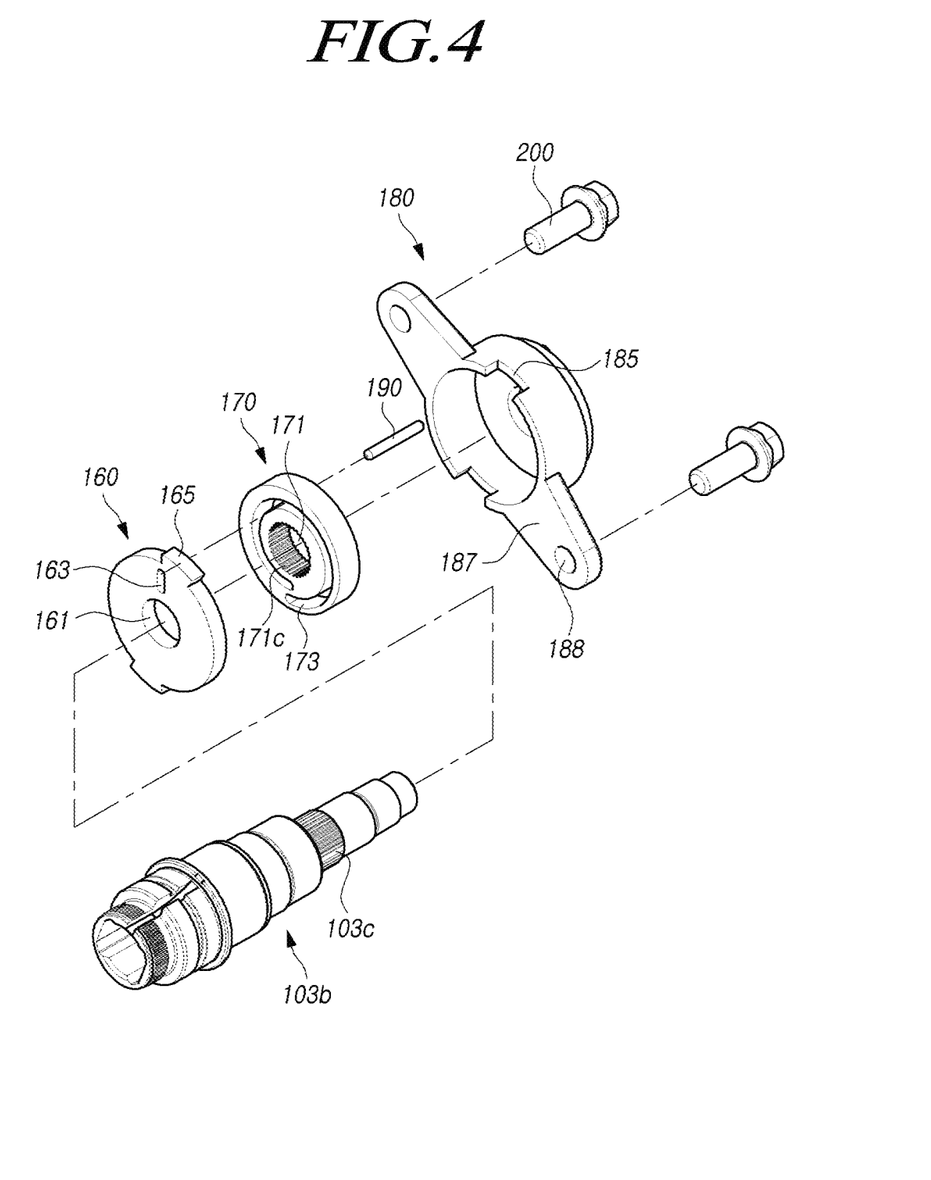
Figure 5:
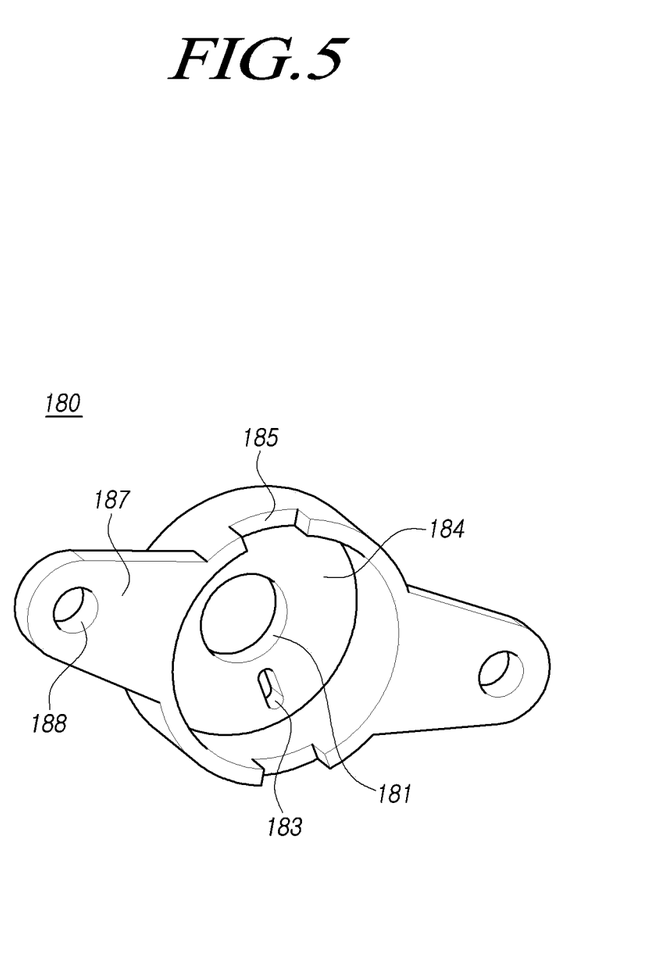
FIG. 5 is a perspective view illustrating a steer by wire type steering apparatus according to the embodiments of the present disclosure.
Figure 6:
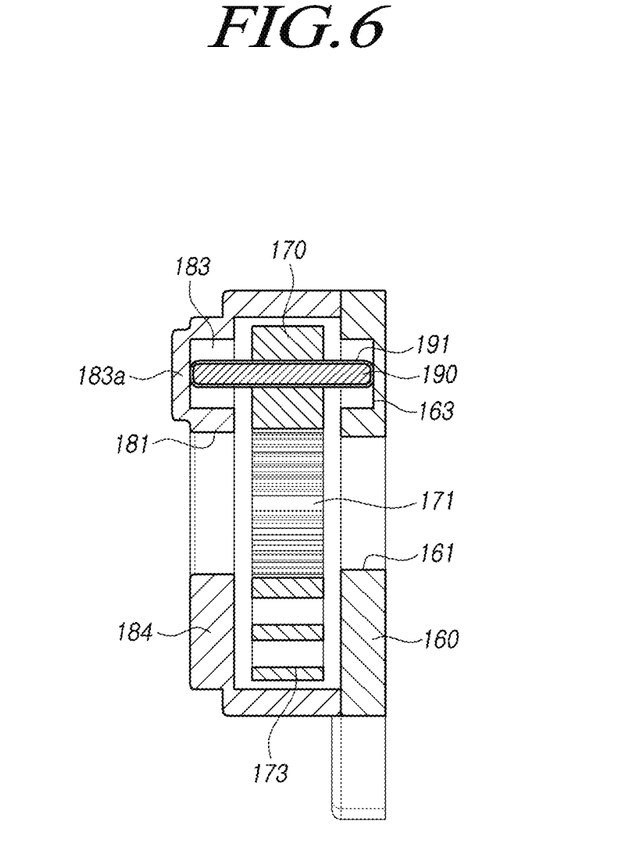
FIG. 6 is a cross-sectional view illustrating a steer by wire type steering apparatus according to the embodiments of the present disclosure.
Figure 7:
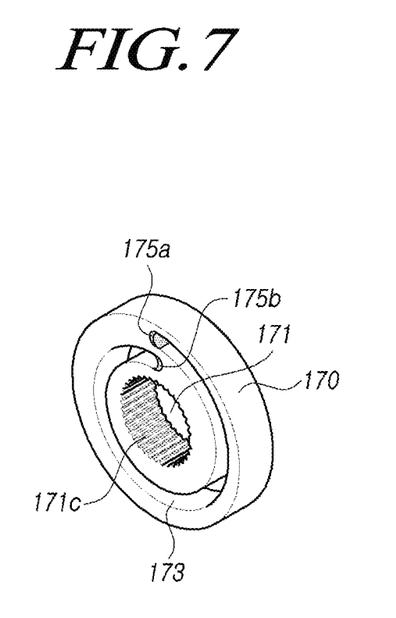
FIGS. 7 and 8 are perspective views illustrating a steer by wire type steering apparatus according to the embodiments of the present disclosure.
Figure 8:
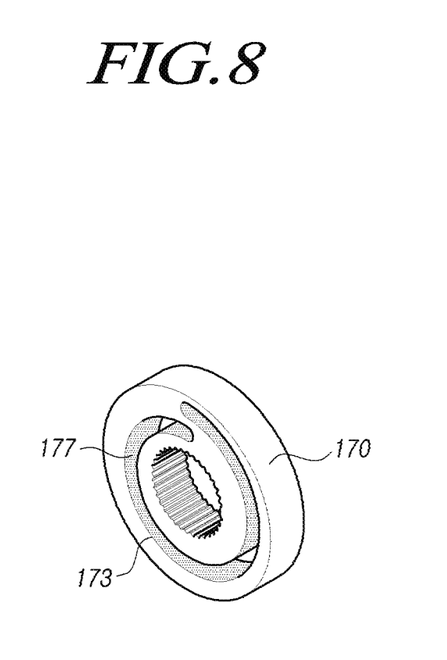
Figure 9:
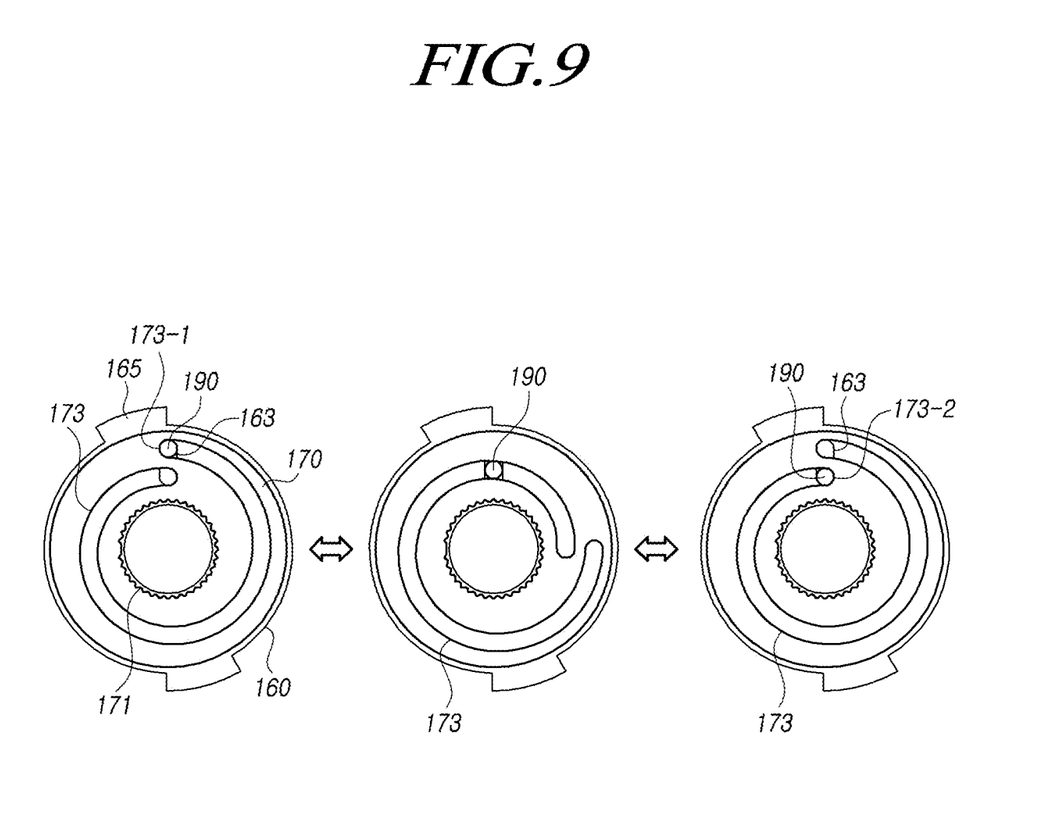
FIG. 9 is a front view illustrating a steer by wire type steering apparatus according to the embodiments of the present disclosure.
Figure 10:
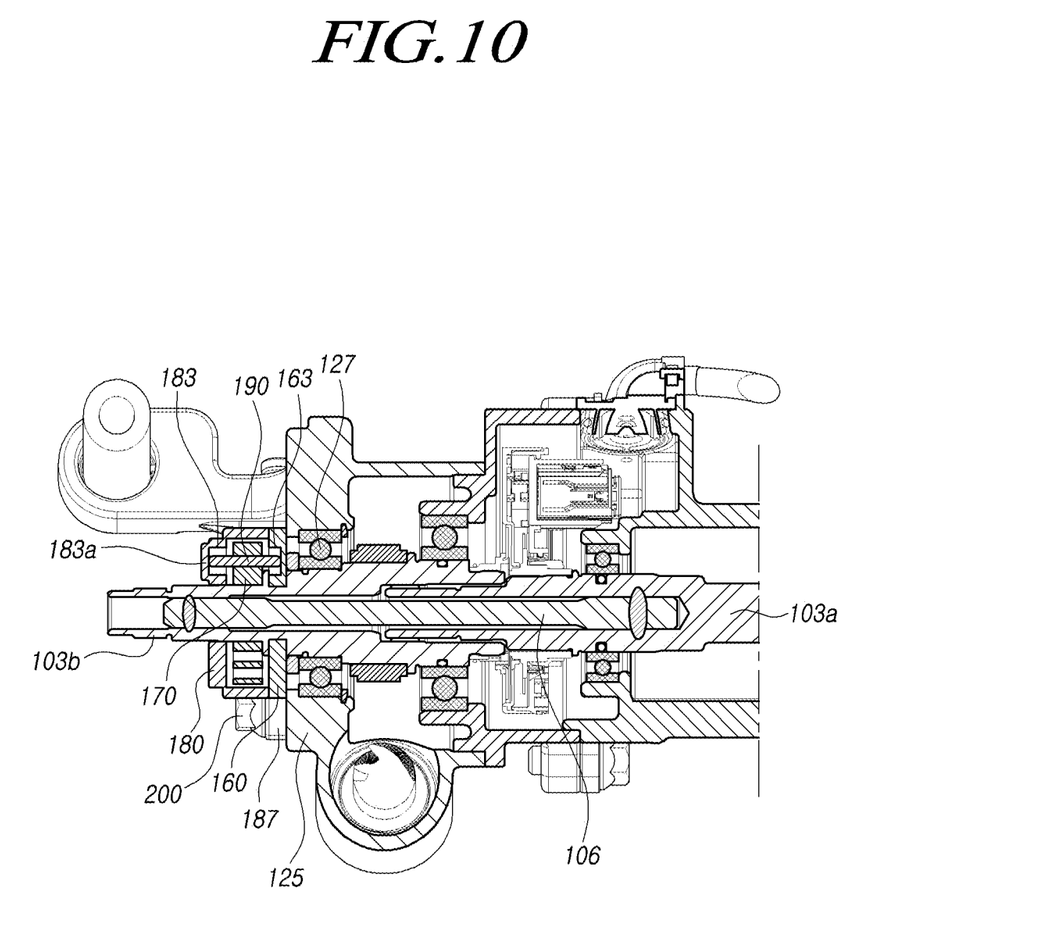
FIG. 10 is a cross-sectional view illustrating a steer by wire type steering apparatus according to the embodiments of the present disclosure.

FIG. 1 is a schematic view illustrating a steer by wire type steering apparatus according to the embodiments of the present disclosure; FIG. 2 is a perspective view illustrating a steer by wire type steering apparatus according to the embodiments of the present disclosure; FIGS. 3 and 4 are exploded perspective views illustrating a steer by wire type steering apparatus according to the embodiments of the present disclosure; FIG. 5 is a perspective view illustrating a steer by wire type steering apparatus according to the embodiments of the present disclosure; FIG. 6 is a cross-sectional view illustrating a steer by wire type steering apparatus according to the embodiments of the present disclosure; FIGS. 7 and 8 are perspective views illustrating a steer by wire type steering apparatus according to the embodiments of the present disclosure; FIG. 9 is a front view illustrating a steer by wire type steering apparatus according to the embodiments of the present disclosure; FIG. 10 is a cross-sectional view illustrating a steer by wire type steering apparatus according to the embodiments of the present disclosure.

Referring to FIGS. 1 to 12, a steer by wire type steering apparatus according to the embodiments of the present disclosure may include a rotating member 170 having a spiral guide hole 173 penetrating through one side and the other side in the axial direction and rotating in conjunction with a steering shaft 103, a housing 180 in which the rotating member 170 is built in, a housing cover 160 coupled to one end of the housing 180, and a guide pin 190 inserted in the axial direction into the guide hole 173, one end supported by the housing 180 and the other end supported by the housing cover 160.

First, referring to FIG. 1, in the steer by wire type steering apparatus according to the present embodiments, an angle sensor 105 and a torque sensor 107 are coupled to one side of the steering shaft 103 connected to the steering wheel 101. When the driver manipulates the steering wheel 101, the angle sensor 105 and the torque sensor 107 that sense it send an electric signal to the electronic control device 110 so that the steering shaft motor 120 and the pinion shaft motor 130 are operated.

The electronic control device 110 controls the steering shaft motor 120 and the pinion shaft motor 130 based on the electrical signals transmitted from the angle sensor 105 and the torque sensor 107 and the electrical signals transmitted from other sensors mounted on the vehicle.

The steering shaft motor 120 is connected to a reducer 135 for reducing the number of revolutions of the motor, and provides a reaction force to the steering shaft 103 so as to feel a steering reaction force in the opposite direction when the driver operates the steering wheel 101 during normal driving. And during autonomous driving, steering is performed by the control of the electronic control device 110 without the driver's will.

The pinion shaft motor 130 slides the rack bar 111 connected to the pinion shaft 113 to steer the vehicle wheels 119 on both sides through the tie rod 115 and the knuckle arm 117.

However, in the drawings in the embodiments of the present disclosure, for convenience of explanation, as an example, the angle sensor 105 and the torque sensor 107 are provided on the steering shaft 103, but a vehicle speed sensor and a motor position sensor for transmitting steering information to the electronic control device 110, various radars, lidar, and image sensors such as cameras may be provided, and a detailed description thereof will be omitted below.

In such a steer by wire type steering apparatus, since the steering wheel 101 and the vehicle wheel 119 are not mechanically connected, when the driver manipulates the steering wheel 101, a mechanical restriction is required to stop the rotation of the steering wheel 101 at a certain angle.

That is, when the rotation of the vehicle wheel 119 reaches the maximum point (in a general steering device, when the steering wheel 101 or the vehicle wheel 119 is in a full-turn state), the rotation angle limiting member 190 for mechanically limiting the rotation angle of the steering shaft 103 is provided so that the steering wheel 101 is not rotated any more. Thus, it provides the driver with an accurate steering feeling.

The rotation angle limiting member 150 may include a rotating member 170 to which the steering shaft 103 is coupled and provided with a spiral guide hole 173, a housing 180 in which the rotating member 170 is built in, a housing cover 160 coupled to one end of the housing 180 and a guide pin 190 inserted into the guide hole 173 in the axial direction.

The rotating member 170 may be integrally formed with the steering shaft 103 or coupled to the steering shaft 103 so as to rotate in association with the steering shaft 103.

As an example, as shown in the drawings of the present disclosure, the rotating member 170 may be formed in a ring shape having a shaft hole 171 to which the steering shaft 103 is coupled. The steering shaft 103 is coupled to a shaft hole 171 to rotate in conjunction with the steering shaft 103, and a spiral guide hole 173 penetrating through one side and the other side in the axial direction may be provided in the rotating member 170.

The housing 180 in which the rotating member 170 is built in is formed in a cylindrical shape with an open one end, and a housing cover 160 for closing the opening of the housing 180 is coupled to the opened one end.

Then, the guide pin 190 is inserted into the guide hole 173 of the rotating member 170 in the axial direction, one end of the guide pin 190 is supported on the housing 180 and the other end of the guide pin 190 is supported on the housing cover 160.

Accordingly, when the rotating member 170 rotates when the steering shaft 103 is rotated and the guide pin 190 is supported by one end and the other end of the guide hole 173, the rotating member 170 is stopped while The rotation angle of the steering shaft 103 is limited.

The steering shaft 103 is formed by coupling the input shaft 103a and the output shaft 103b via the torsion bar 106. One or more shafts may be additionally connected to the steering shaft 103, and the rotating member 170 is coupled to the outer peripheral surface of the output shaft 103b.

The outer circumferential surface of the steering shaft 103 and the inner circumferential surface of the shaft hole 171 of the rotating member 170 may be formed in the same shape corresponding to each other, such as an elliptical shape, a "D" shape, a "⌴" shape, etc. In the present embodiments, as an example, serrations 103c and 171c corresponding to each other are provided on the outer circumferential surface of the steering shaft 103 and the inner circumferential surface of the shaft hole 171 of the rotating member 170. Accordingly, when the steering shaft 103 is rotated, the output shaft 112 and the rotating member 170 are interlocked and rotate without slipping.

And, a fastening flange 187 extending in a radial direction is provided on the outer circumferential surface of one end of the housing 180, and a fastening hole 188 is provided in the fastening flange 187.

Accordingly, the housing 180 is coupled to the column housing 125 by the fastening member 200 passing through the fastening hole 188.

A bulkhead 184 having a through hole 181 through which the steering shaft 103 passes is provided at the other end opposite to the opened one end of the housing 180, so that the steering shaft 103 is inserted through the through hole 181.

A housing support groove 183 in which one end of the guide pin 190 is supported is formed on the inner surface of the bulkhead 184 in a radial direction, so that the guide pin 190 may move in a radial direction along the housing support groove 183 when the rotating member 170 rotates.

And, one end of the rotating member 170 is disposed to be spaced apart in the axial direction facing the inner surface of the bulkhead 184 of the housing 180, so that the rotating member 170 is rotated without interference from the bulkhead 184 when the steering shaft 103 is rotated.

In addition, the housing 180 is provided with an outer protrusion 183a protruding to the outside on the outer surface of the bulkhead 184 to extend the depth of the housing support groove 183, so that one end of the guide pin 190 is supported without being separated from the housing support groove 183.

And, a coupling groove 185 recessed in the axial direction is provided at one end of the opened side of the housing 180, and an extended end 165 coupled to the coupling groove 185 of the housing 180 is provided on the outer peripheral surface of the housing cover 160. Accordingly, the housing cover 160 is press-fitted to one end of the housing 180 to be closely coupled.

The housing cover 160 is formed in a substantially ring shape provided with a shaft through hole 161 through which the steering shaft passes, the other end of the rotating member 170 is disposed to be spaced apart in an axial direction facing the inner surface of the housing cover 160. When the steering shaft 103 rotates, the rotating member 170 rotates without interference from the housing cover 160.

In addition, the housing cover 160 has a cover support portion 163 is formed in the radial direction at a position facing the housing support groove 183 in the axial direction, and the other end of the guide pin 190 is supported by the cover support 163.

The cover support portion 163 may be formed to penetrate the inner and outer surfaces of the housing cover 160, or may be formed as a recess recessed in the inner surface of the housing cover 160.

That is, as shown in FIGS. 3 and 4, the cover support portion 163 penetrates the inner and outer surfaces of the housing cover 160 to facilitate assembly of the housing 180 and the housing cover 160. Alternatively, as shown in FIG. 6, the cover support portion 163 is formed as a recessed groove in the inner surface of the housing cover 160, thereby further improving the support force of both sides of the guide pin 190.

In addition, as shown in FIG. 6, a pin damper 191 is provided on the outer circumferential surface of the guide pin 190, so that it can be elastically deformed when in contact with one end and the other end of the guide hole 173.

Therefore, when the rotating member 170 rotates, the guide pin 190 is elastically deformed when it comes into contact with one end and the other end of the guide hole 173, thereby buffering and reducing noise at the time of stopping.

And, as shown in FIG. 7, slot dampers 175a and 175b are provided at one end and the other end of the guide hole 173 provided in the rotating member 170 to elastically deform when in contact with the guide pin 190. Therefore, when the rotating member 170 rotates, the guide pin 190 comes into contact with one end and the other end of the guide hole 173 and elastically deforms, thereby buffering and reducing noise at the time of stopping.

And, as shown in FIG. 8, the inner surface of the guide hole 173 is provided with a coating portion 177 of a low friction material, so that when the rotating member 170 rotates, it is possible to reduce friction noise due to contact with the guide pin 190.

Such a rotating member 170 has a limited rotation angle, which will be described with reference to FIG. 9, as shown in the left drawing, when the guide pin 190 is supported by the outermost end 173-1 in the circumferential direction of the guide hole 173, the clockwise rotation of the rotating member 170 is stopped, and the guide pin 190 is positioned at the outermost radial direction.

And, as shown in the middle drawing of FIG. 9, when the driver rotates the steering shaft 103 to rotate the rotating member 170 counterclockwise, the guide pin 190 moves radially inward along the guide hole 173. As shown in the right drawing of FIG. 9, when the guide pin 190 is supported by the innermost end 173-2 of the guide hole 173 and the counterclockwise rotation of the rotating member 170 is stopped, the guide pin 190 is positioned at the innermost in the radial direction and the rotation angle is limited.

Here, the rotation angle is shown as a design standard of approximately 360 degrees, but the positions of the outermost end and the innermost end of the guide hole 173 may be changed according to the design standard according to the driving environment of the vehicle.

As described above, according to the embodiments of the present disclosure, there is provided a steer by wire type steering apparatus that increases a driver's steering feel and steering safety by preventing the steering wheel from mechanically rotating anymore when the rotation of the vehicle wheel reaches the maximum point.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steer by wire type steering apparatus comprising:
    a rotating member having a spiral guide hole penetrating through one side and the other side in the axial direction and rotating in conjunction with a steering shaft;
    a housing in which the rotating member is built in;
    a housing cover coupled to one end of the housing; and
    a guide pin inserted in the axial direction into the guide hole, one end supported by the housing and the other end supported by the housing cover.

2. The steer by wire type steering apparatus of claim 1, wherein the housing is formed in a cylindrical shape with one end open, and the housing cover closes one end of the housing and is coupled thereto.

3. The steer by wire type steering apparatus of claim 1, wherein the rotating member is provided with a shaft hole to which the steering shaft is coupled, and serrations are formed on an outer circumferential surface of the steering shaft and an inner circumferential surface of the shaft hole.

4. The steer by wire type steering apparatus of claim 1, wherein a fastening flange extending in a radial direction is provided on an outer circumferential surface of one end of the housing.

5. The steer by wire type steering apparatus of claim 4, wherein the fastening flange is provided with a fastening hole and the housing is coupled to a column housing by a fastening member passing through the fastening hole.

6. The steer by wire type steering apparatus of claim 1, wherein a bulkhead having a through hole through which the steering shaft passes is provided at the other end of the housing.

7. The steer by wire type steering apparatus of claim 6, wherein a housing support groove in which one end of the guide pin is supported is formed on an inner surface of the bulkhead in a radial direction.

8. The steer by wire type steering apparatus of claim 7, wherein one end of the rotating member is disposed to be spaced apart in an axial direction facing the inner surface of the bulkhead.

9. The steer by wire type steering apparatus of claim 7, wherein the housing is provided with an outer protrusion protruding from the outer surface of the bulkhead to extend the depth of the housing support groove.

10. The steer by wire type steering apparatus of claim 7, wherein a coupling groove is provided at one end of the housing, and an extended end coupled to the coupling groove is provided at an outer peripheral surface of the housing cover.

11. The steer by wire type steering apparatus of claim 10, wherein the other end of the rotating member is disposed to be spaced apart in an axial direction facing the inner surface of the housing cover.

12. The steer by wire type steering apparatus of claim 10, wherein the housing cover is provided with a cover support portion in a radial direction at a position facing the housing support groove, the other end of the guide pin is supported on the cover support portion.

13. The steer by wire type steering apparatus of claim 12, wherein the cover support portion is formed to pass through the inner surface and the outer surface of the housing cover.

14. The steer by wire type steering apparatus of claim 12, wherein the cover support portion is formed as a recess recessed in the inner surface of the housing cover.

15. The steer by wire type steering apparatus of claim 1, wherein a slot damper that is elastically deformed when in contact with the guide pin is provided at one end and the other end of the guide hole.

16. The steer by wire type steering apparatus of claim 1, wherein a pin damper that is elastically deformed when in contact with one end and the other end of the guide hole is provided on the outer peripheral surface of the guide pin.

17. The steer by wire type steering apparatus of claim 1, wherein a coating portion formed of a low-friction material is provided on the inner surface of the guide hole.

* * * * *